United States Patent
Ito et al.

(10) Patent No.: US 11,646,061 B2
(45) Date of Patent: May 9, 2023

(54) BASE PLATE, SPINDLE MOTOR, DISK DRIVE APPARATUS AND MANUFACTURING METHOD OF BASE PLATE

(71) Applicant: NIDEC CORPORATION, Kyoto (JP)

(72) Inventors: Michihiro Ito, Kyoto (JP); Ryo Furuya, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/674,838

(22) Filed: Feb. 18, 2022

(65) Prior Publication Data
US 2022/0262403 A1   Aug. 18, 2022

(30) Foreign Application Priority Data
Feb. 18, 2021 (JP) .............................. JP2021-024675

(51) Int. Cl.
| G11B 25/04 | (2006.01) |
| G11B 33/12 | (2006.01) |
| G11B 19/20 | (2006.01) |
| B22D 17/00 | (2006.01) |

(52) U.S. Cl.
CPC ............ *G11B 25/043* (2013.01); *B22D 17/00* (2013.01); *G11B 19/2009* (2013.01); *G11B 33/124* (2013.01)

(58) Field of Classification Search
None
See application file for complete search history.

(56) References Cited

U.S. PATENT DOCUMENTS

| 9,990,959 | B1 * | 6/2018 | Ito ........................ G11B 25/043 |
| 10,102,882 | B1 * | 10/2018 | Ino ........................ G11B 5/4813 |
| 11,456,012 | B1 * | 9/2022 | Showa .................. G11B 33/022 |
| 2012/0250184 | A1 * | 10/2012 | Inoue ................... G11B 25/043 |
|  |  |  | 29/603.03 |
| 2016/0365105 | A1 * | 12/2016 | Kimura ................ G11B 5/4813 |
| 2019/0093234 | A1 * | 3/2019 | Sakurada ........... G11B 33/1446 |
| 2019/0267044 | A1 * | 8/2019 | Yoshimura ........... G11B 33/121 |
| 2022/0130428 | A1 * | 4/2022 | Suzuki ................. G11B 33/022 |
| 2022/0262399 | A1 * | 8/2022 | Ito ........................... H02K 5/06 |
| 2022/0262408 | A1 * | 8/2022 | Ito ..................... B22D 17/2069 |

FOREIGN PATENT DOCUMENTS

| JP | 2015127064 |   | 7/2015 |
| JP | 2015127064 | A * | 7/2015 |

* cited by examiner

*Primary Examiner* — William J Klimowicz
(74) *Attorney, Agent, or Firm* — JCIPRNET (57) ABSTRACT

A base plate is a portion of a housing of a disk drive apparatus, including a base body being a casting product, and an electrodeposition coating film covering at least a portion of a surface of the base body. The base body includes a bottom plate rectangular as viewed from an axial direction, a pivot post, and a protrusion. The bottom plate extends perpendicular to a rotation axis of a disk that extends vertically and a swing axis of a head that is disposed in a different position from the rotation axis and that extends vertically. The head reads or writes information from or to the disk. The pivot post protrudes upward from an upper surface of the bottom plate along the swing axis. The protrusion is provided protruding radially outward from a peripheral surface of the pivot post and protruding to the upper surface of the bottom plate.

15 Claims, 13 Drawing Sheets

BASE PLATE, SPINDLE MOTOR, DISK DRIVE APPARATUS AND MANUFACTURING METHOD OF BASE PLATE

CROSS REFERENCE TO RELATED APPLICATIONS

The present invention claims priority under 35 U.S.C. § 119 to Japanese Application No. 2021-024675 filed on Feb. 18, 2021 the entire content of which is incorporated herein by reference.

FIELD OF THE INVENTION

The present disclosure relates to a base plate, a spindle motor, a disk drive apparatus, and a manufacturing method of a base plate.

BACKGROUND

A case body (base plate) being a portion of a housing of a conventional disk drive apparatus includes a bottom surface part having a rectangular shape and an actuator attachment part (pivot post). The actuator attachment part protrudes upward from an upper surface of the bottom surface part.

However, in the conventional case body, the fluidity of molten metal to the actuator attachment part is poor during casting and molding, and a shrinkage cavity may occur in the actuator attachment part. Hence, there is a possibility that helium gas filled inside the housing may leak to the outside via the actuator attachment part.

SUMMARY

An exemplary base plate of the present disclosure is a base plate being a portion of a housing of a disk drive apparatus. The base plate includes a base body being a casting product, and an electrodeposition coating film covering at least a portion of a surface of the base body. The base body includes a bottom plate having a rectangular shape as viewed from an axial direction, a pivot post, and a protrusion. The bottom plate extends perpendicular to a rotation axis of a disk and a swing axis of a head. The rotation axis extends vertically. The swing axis is disposed in a different position from the rotation axis and extends vertically. The head reads or writes information from or to the disk. The pivot post protrudes upward from an upper surface of the bottom plate along the swing axis. The protrusion is provided protruding radially outward from a peripheral surface of the pivot post and protruding to the upper surface of the bottom plate.

An exemplary manufacturing method of a base plate of the present disclosure is a manufacturing method of a base plate of a casting product being a portion of a housing of a disk drive apparatus. The manufacturing method includes a casting process, a cutting process, and an electrodeposition coating process in order. In the casting process, a base body that includes a bottom plate having a rectangular shape as viewed from an axial direction, a pivot post and a bridge is integrally cast by a mold. The bottom plate extends perpendicular to a rotation axis of a disk and a swing axis of a head. The rotation axis extends vertically. The swing axis is disposed in a different position from the rotation axis and extends vertically. The head reads or writes information from or to the disk. The pivot post protrudes upward from an upper surface of the bottom plate along the swing axis. The bridge protrudes radially outward from a peripheral surface of the pivot post and spans across the upper surface of the bottom plate. In the cutting process, the bridge is cut. In the electrodeposition coating process, an electrodeposition coating film is provided on a surface of the base body.

The above and other elements, features, steps, characteristics and advantages of the present disclosure will become more apparent from the following detailed description of the preferred embodiments with reference to the attached drawings.

DETAILED DESCRIPTION

Exemplary embodiments of the present disclosure are described in detail with reference to the drawings. In the present specification, a rotation axis C of a disk 50 and a swing axis D of a head extend parallel to each other in different positions. In the present application, a direction parallel to the rotation axis C or the swing axis D, a direction orthogonal to the swing axis D, and a direction along an arc centered on the rotation axis C or the swing axis D are referred to as an "axial direction", a "radial direction", and a "circumferential direction", respectively. In the present application, the shape and positional relationship of each part are described by taking the axial direction as an up-down direction and a cover 42 side as an upper side with respect to a base plate 41. However, this definition of the up-down direction does not intend to limit the orientation of the base plate 41 and a disk drive apparatus 1 according to the present disclosure during use.

Figure 1:
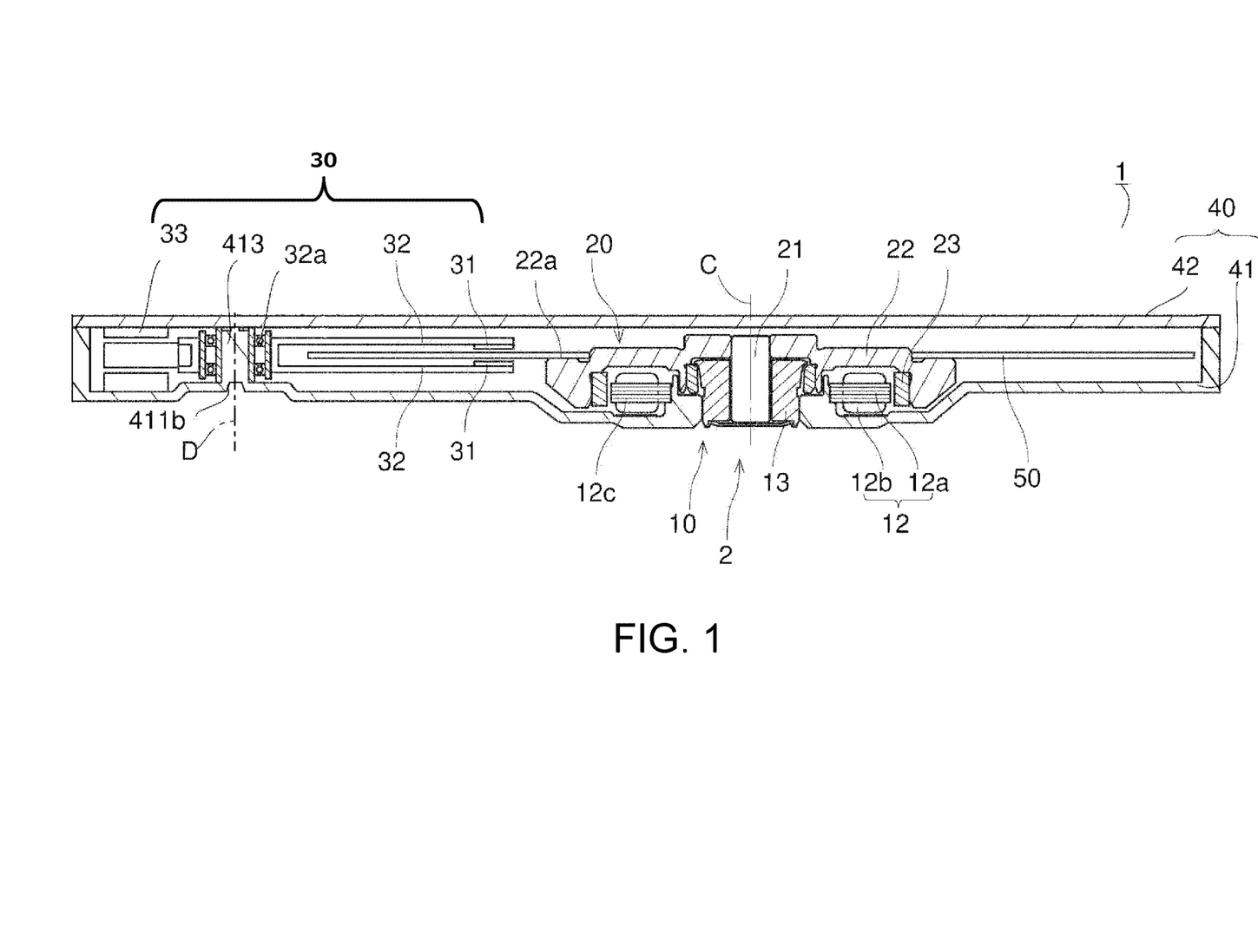
FIG. 1 is a longitudinal sectional view of a disk drive apparatus according to an exemplary embodiment of the present disclosure.

The disk drive apparatus 1 of an exemplary embodiment of the present disclosure is described. FIG. 1 is a longitudinal sectional view of the disk drive apparatus 1 according to an exemplary embodiment of the present disclosure.

The disk drive apparatus 1 is a hard disk drive. The disk drive apparatus 1 includes a spindle motor 2, the disk 50, a head 31, an arm 32, a swing mechanism 33, and a housing 40.

The housing 40 houses therein the spindle motor 2, the disk 50, the head 31, and the arm 32.

A gas having a density lower than that of air is filled inside the housing 40. Specifically, helium gas is filled. Hydrogen gas or the like may be filled instead of the helium gas.

The housing 40 is defined by a cast and molded metal die cast member including an aluminum alloy as a material. A metal other than aluminum alloy may be used for the die cast member.

The housing 40 includes the base plate 41 and the cover 42. Inside the housing 40, the disk 50, the spindle motor 2 and an access part 30 are disposed on the base plate 41. An upper opening of the base plate 41 is closed by the cover 42. The base plate 41 will be described in detail later.

The spindle motor 2 rotates the disk 50 about the rotation axis C while supporting the disk 50. That is, the disk 50 is rotated about the rotation axis C by the spindle motor 2. The spindle motor 2 includes a stationary part 10 and a rotary part 20. The stationary part 10 is stationary relative to the housing 40. The rotary part 20 is rotatably supported with respect to the stationary part 10.

The stationary part 10 includes a stator 12 and a bearing unit 13. A portion of the base plate 41 defines the stationary part 10. That is, the spindle motor 2 includes the base plate 41. The base plate 41 extends perpendicular to the rotation axis C on a lower side of the rotary part 20. The base plate 41 is a portion of the spindle motor 2 as well as a portion of the housing 40. The stator 12 and the bearing unit 13 are fixed to the base plate 41.

The stator 12 includes a stator core 12a being a magnetic body, and multiple coils 12b. The stator core 12a has multiple teeth 12c protruding radially outward. The multiple coils 12b are defined by lead wires wound around the teeth 12c.

The bearing unit 13 rotatably supports a shaft 21 on the rotary part 20 side. A fluid dynamic pressure bearing mechanism, for example, is used for the bearing unit 13.

The rotary part 20 includes the shaft 21, a hub 22, and a magnet 23. The shaft 21 is a member having a columnar or substantially columnar shape extending in the axial direction. A lower end of the shaft 21 is housed inside the bearing unit 13.

The hub 22 is fixed to an upper end of the shaft 21 and extends radially outward. An upper surface of an outer peripheral part 22a of the hub 22 supports the disk 50. The magnet 23 is fixed to an inner peripheral surface of the hub 22 and is disposed at a predetermined distance radially outside of the stator 12 and facing the stator 12. The magnet 23 has an annular or substantially annular shape, and the N pole and the S pole are alternately magnetized in the circumferential direction on an inner peripheral surface of the magnet 23.

When a drive current is supplied to the coils 12b, a magnetic flux is generated in the multiple teeth 12c. Torque in the circumferential direction is generated by interaction of the magnetic flux between the teeth 12c and the magnet 23. As a result, the rotary part 20 rotates about the rotation axis C with respect to the stationary part 10. The disk 50 supported by the hub 22 rotates about the rotation axis C together with the rotary part 20.

The disk 50 is an information recording medium having a discoid shape and having a hole in a central part. Each disk 50 is mounted on the spindle motor 2 and is disposed parallel to each other and at equal intervals in the axial direction via a spacer (not illustrated).

The head 31 magnetically reads or writes information from or to the disk 50. The arm 32 is attached to a tip of a later-described pivot post 413 of the base plate 41 via a bearing 32a. The head 31 is provided at a tip of the arm 32.

The swing mechanism 33 is a mechanism for swinging the arm 32 and the head 31. When the swing mechanism 33 is driven, the arm 32 swings about the swing axis D. That is, the head 31 swings about the swing axis D by the swing mechanism 33 via the arm 32. At this time, the head 31 moves relative to the disk 50, and approaches and accesses the disk 50 that rotates.

Figure 2:
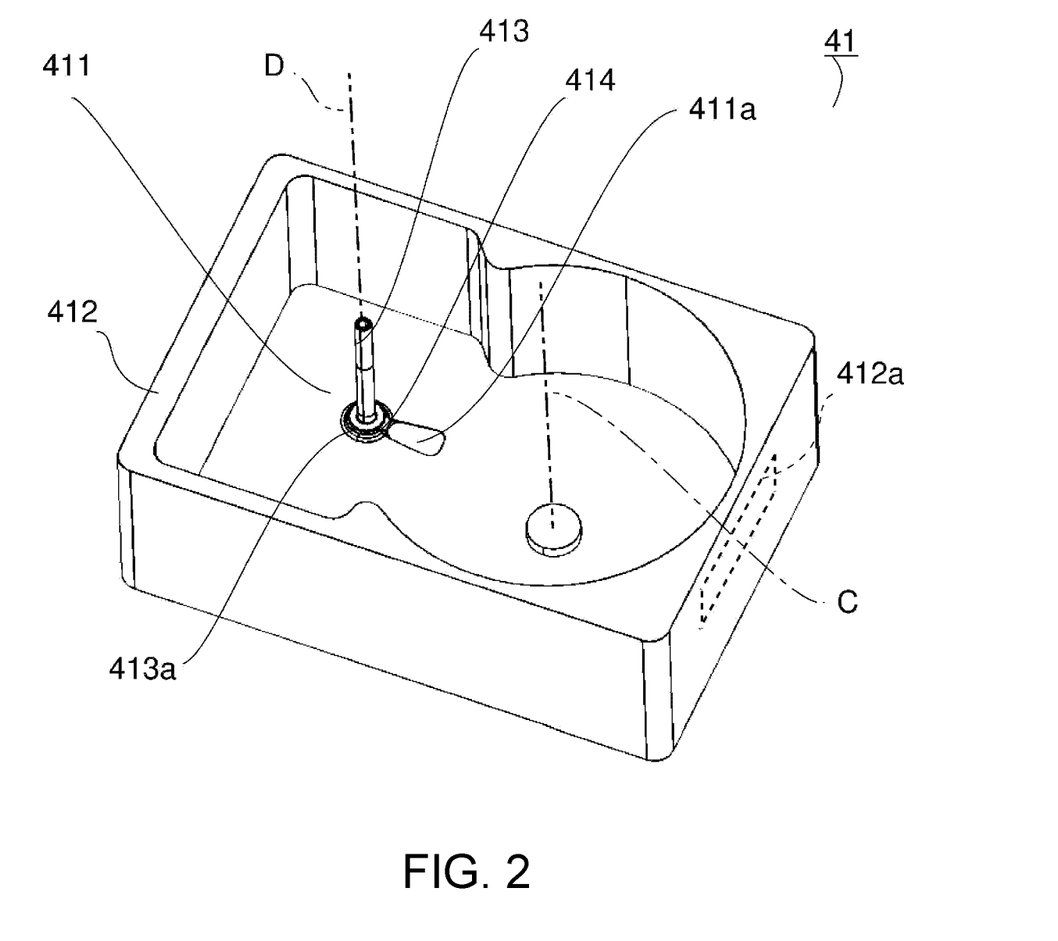
FIG. 2 is a perspective view schematically illustrating a base plate according to an exemplary embodiment of the present disclosure.
Figure 3:
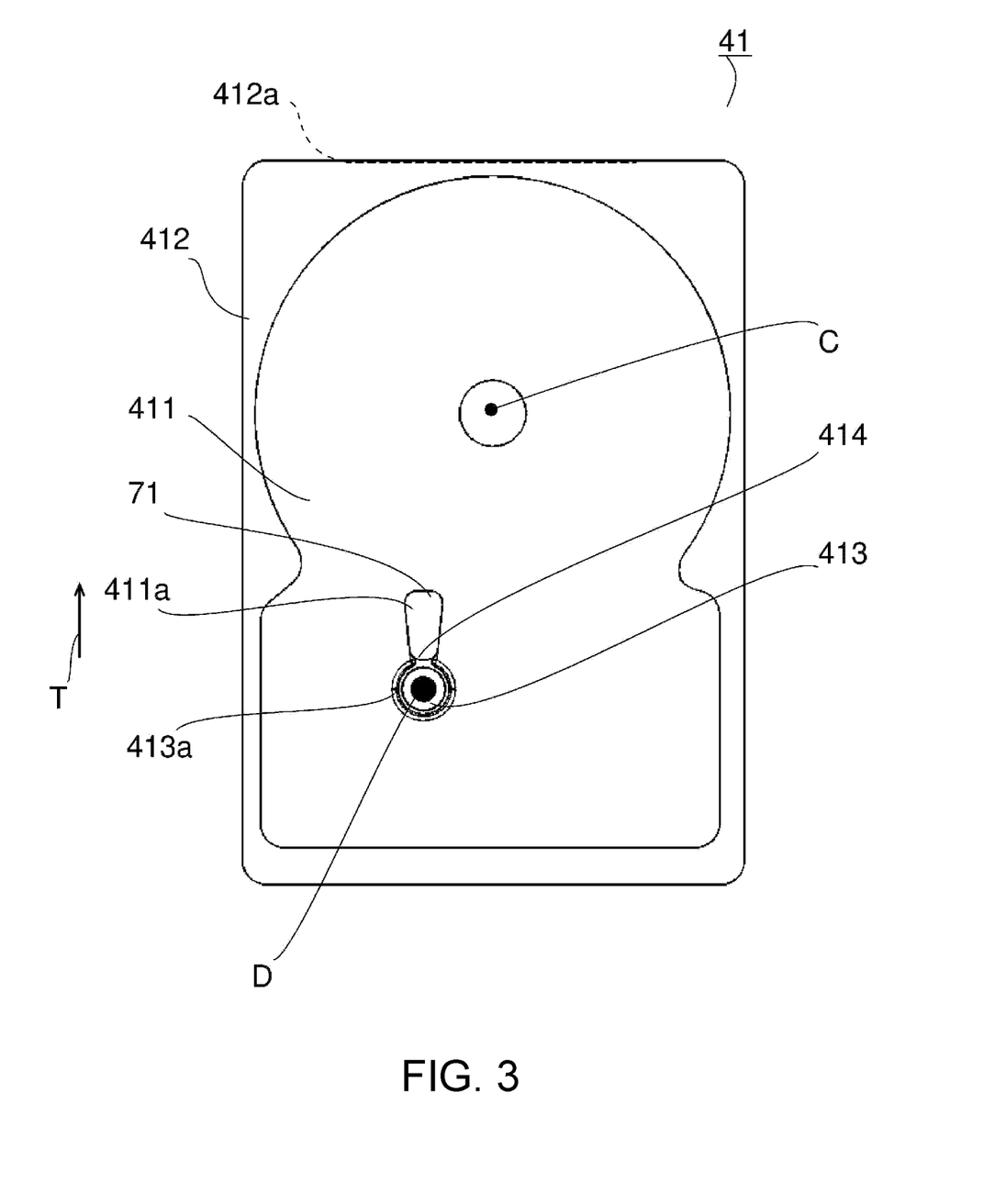
FIG. 3 is a top view schematically illustrating a base plate according to an exemplary embodiment of the present disclosure.
Figure 4:
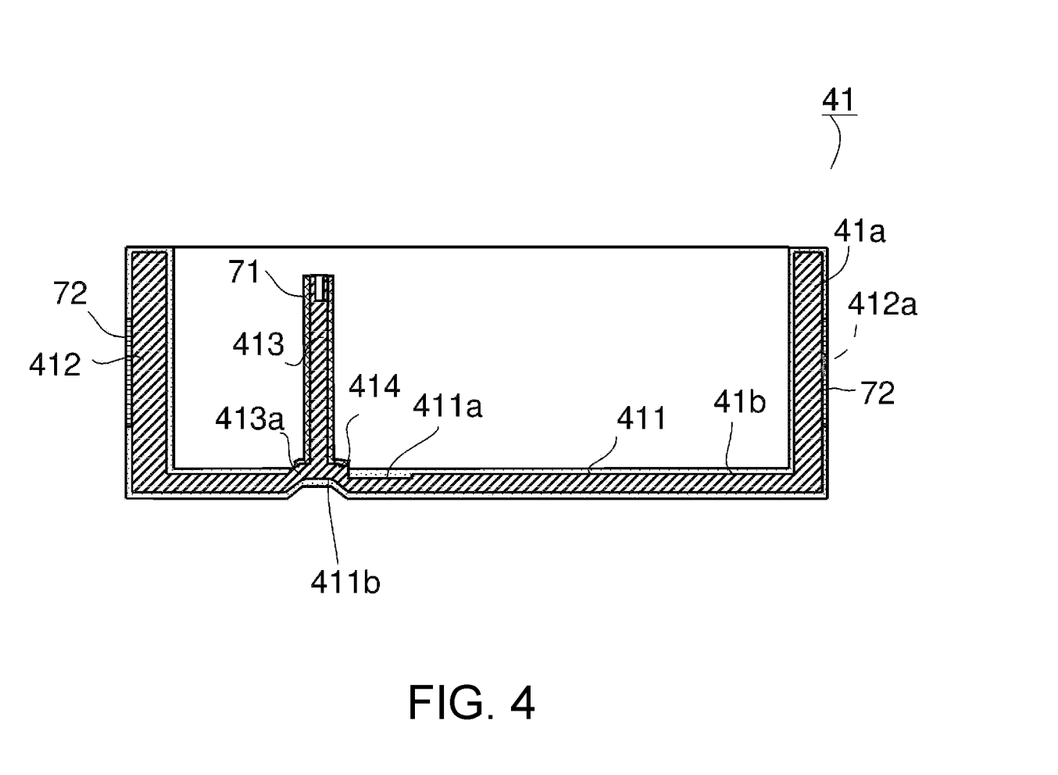
FIG. 4 is a longitudinal sectional view schematically illustrating a base plate according to an exemplary embodiment of the present disclosure.

FIG. 2 is a perspective view schematically illustrating the base plate 41, and FIG. 3 is a top view schematically illustrating the base plate 41. FIG. 4 is a longitudinal sectional view schematically illustrating the base plate 41. A gate mark 412a illustrated in FIG. 4 is illustrated for description, while vestiges are removed in a later-described manufacturing process of the base plate 41.

The base plate 41 includes a base body 41a being a casting product, and an electrodeposition coating film 41b covering a surface of the base body 41a.

The base body 41a is provided in a box shape with an open top, and includes a bottom plate 411, a peripheral wall 412, the pivot post 413, and a protrusion 414. The bottom plate 411 has a rectangular or substantially rectangular shape as viewed from the axial direction, and extends perpendicular to the rotation axis C and the swing axis D.

The peripheral wall 412 is defined by multiple walls extending upward from an outer peripheral edge of the bottom plate 411 and surrounding the bottom plate 411. The cover 42 is disposed on an upper end surface of the peripheral wall 412 and is, for example, screwed. The peripheral wall 412 includes the gate mark 412a where a gate 214 was connected during casting. The gate mark 412a is disposed on an outer surface of the peripheral wall 412 intersecting a protrusion direction T of the protrusion 414.

The pivot post 413 protrudes upward from an upper surface of the bottom plate 411 along the swing axis D and is provided in a columnar or substantially columnar shape. The pivot post 413 includes a pedestal 413a having an annular or substantially annular shape and protruding radially outward from a peripheral surface of a root portion. By providing the pedestal 413a, rigidity of the pivot post 413 at the root portion is able to be improved.

The protrusion 414 is provided protruding radially outward from a peripheral surface of the pivot post 413 toward the gate mark 412a and protruding to the upper surface of the bottom plate 411. By providing the protrusion 414, the rigidity of the pivot post 413 is improved. Since the protrusion 414 protrudes toward the gate mark 412a, deformation of the pivot post 413 toward the disk 50 is able to be prevented.

The bottom plate 411 includes a first concave part 411a and a second concave part 411b. The first concave part 411a is adjacent to the protrusion 414 in the protrusion direction T at a later-described first machined surface 71, and is defined by the upper surface of the bottom plate 411 being recessed downward in the axial direction. By providing the first concave part 411a, the base plate 41 is able to be reduced in weight. By providing the first concave part 411a, around the pivot post 413, interference between the upper surface of the bottom plate 411 and a component is reduced, and the component is able to be disposed near the root of the pivot post 413. The first concave part 411a is defined whose length in a width direction orthogonal to the protrusion direction T increases toward the protrusion direction T.

The protrusion 414 and the first concave part 411a are defined when a later-described bridge 415 that is defined during casting is cut.

The second concave part 411b is defined by a lower surface of the bottom plate 411 opposed to the pivot post 413 in the axial direction being recessed upward in the axial direction. The second concave part 411b is a recess having a conical trapezoidal or substantially conical trapezoidal shape and is circular or substantially circular in bottom view. That is, an inner diameter of the second concave part 411b is defined to gradually decrease upward in the axial direction. By providing the second concave part 411b, the base plate 41 is able to be further reduced in weight. As will be described later, by providing the second concave part 411b, the flow of molten metal is turned upward during casting, and the fluidity of molten metal to the tip side of the pivot post 413 is able to be promoted.

Figure 5:
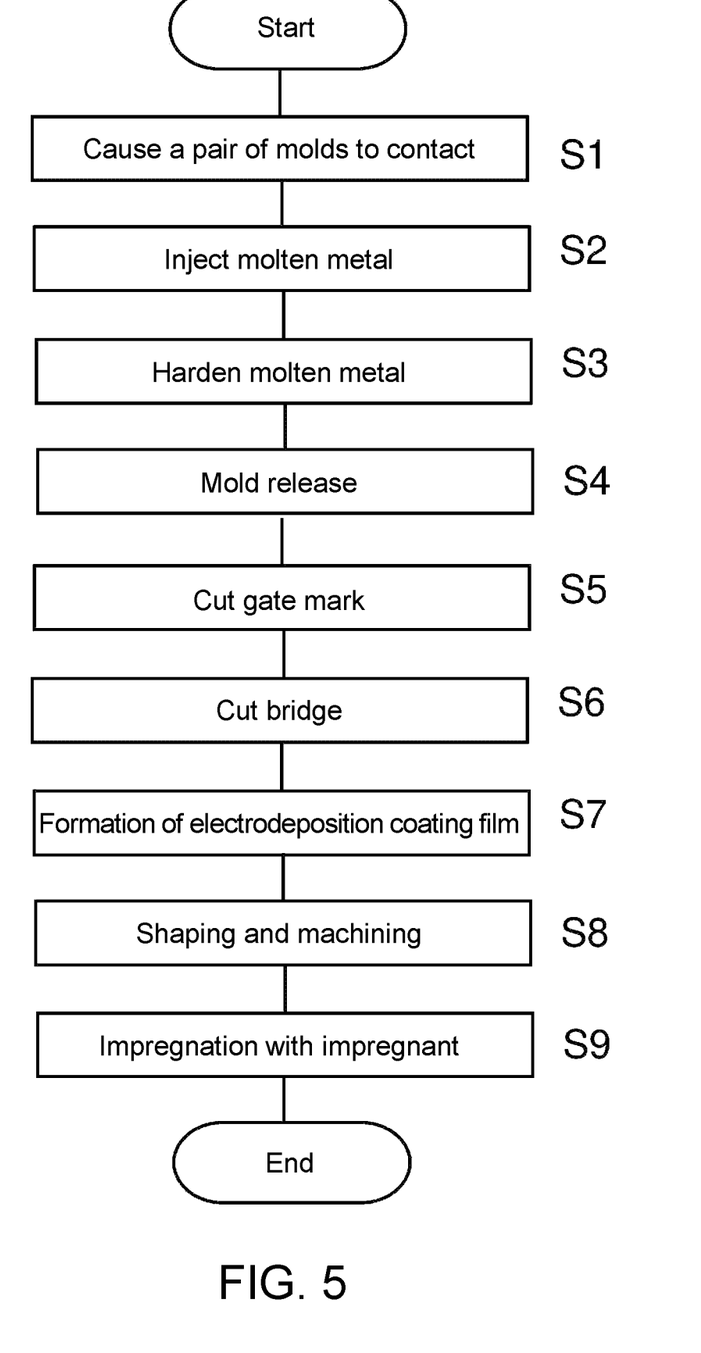
FIG. 5 is a flowchart illustrating a manufacturing process of a base plate according to an exemplary embodiment of the present disclosure.

FIG. 5 is a flowchart illustrating a manufacturing process of the base plate 41. FIG. 6 to FIG. 10 are explanatory diagrams describing a manufacturing process of a base plate.

Figure 6:
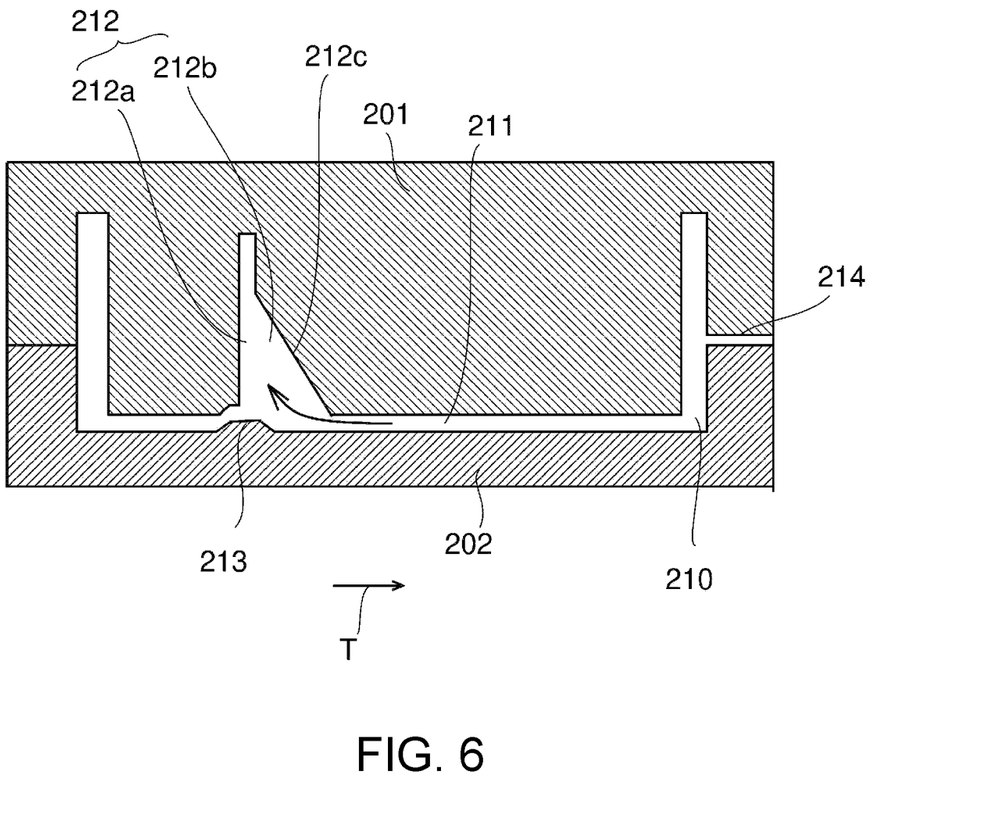
FIG. 6 is an explanatory diagram describing a manufacturing process of a base plate according to an exemplary embodiment of the present disclosure.

In step S1, as illustrated in FIG. 6, a peripheral edge of a mold 201 and a peripheral edge of a mold 202 are brought into contact with each other in the up-down direction, and a cavity 210 is defined between the mold 201 and the mold 202. The cavity 210 has a shape corresponding to the shape of the base body 41a. The cavity 210 communicates with the gate 214 extending along facing surfaces of the mold 201 and the mold 202. An outer end of the gate 214 opens to the outside of the mold 201 and the mold 202.

On the facing surfaces of the mold 201 and the mold 202, an air bleeding flow path (not illustrated) for bleeding air in the cavity 210 is provided separately from the gate 214. An outer end of the air bleeding flow path opens to the outside of the mold 201 and the mold 202.

The cavity 210 includes a plate-shaped part 211, a convex part 212, and a recess 213. The molten metal flows into the plate-shaped part 211 and the bottom plate 411 is defined.

The convex part 212 includes a columnar part 212a and a guide 212b. The columnar part 212a extends upward in the axial direction from the plate-shaped part 211 and is provided in a columnar or substantially columnar shape. The molten metal flows into the columnar part 212a and the pivot post 413 is defined.

The guide 212b protrudes toward the gate 214 from a portion of a peripheral surface of the columnar part 212a and has an inclined plane 212c that tilts downward toward the gate 214. The guide 212b is provided in a triangular or substantially triangular shape, the molten metal flows into the guide 212b and the bridge 415 is defined (see FIG. 8). The guide 212b is defined whose length in the width direction orthogonal to the protrusion direction T increases toward the protrusion direction T.

The recess 213 faces the columnar part 212a in the up-down direction, and the second concave part 411b is defined when the molten metal flows into the plate-shaped part 211.

In step S2, the molten metal is injected into the cavity 210 via the gate 214. The molten metal is, for example, a molten aluminum alloy. When the molten metal is injected into the cavity 210, the air in the cavity 210 or a gas generated from the molten metal is pushed out of the mold 201 and the mold 202 from the air bleeding flow path. Accordingly, the molten metal spreads throughout the cavity 210.

At this time, the molten metal that has flowed from the gate 214 into the plate-shaped part 211 is likely to flow into the columnar part 212a via the guide 212b.

The guide 212b is defined whose length in the width direction orthogonal to the protrusion direction T increases forward in the protrusion direction T, and the molten metal is smoothly guided from the guide 212b toward the columnar part 212a. By the inclined plane 212c, the molten metal is guided to a tip of the columnar part 212a and is relatively likely to flow into the columnar part 212a. Further, by the recess 213, the flow of molten metal is turned upward, and the flow is facilitated by the columnar part 212a. Accordingly, by providing the bridge 415 and casting the pivot post 413, the occurrence of shrinkage cavities in the pivot post 413 is able to be reduced.

In step S3, after the molten metal has spread throughout the cavity 210, the molten metal is cooled and hardened. Accordingly, the base body 41a (see FIG. 7) is defined in the cavity 210. A chill layer (not illustrated) is defined on the surface of the base body 41a. When the molten metal is hardened, the chill layer is defined where the mold 201 and the mold 202 are in contact and the hardening is fast. The chill layer in which hardening of the molten metal is faster than other portions has few impurities and a high metal density.

Figure 7:
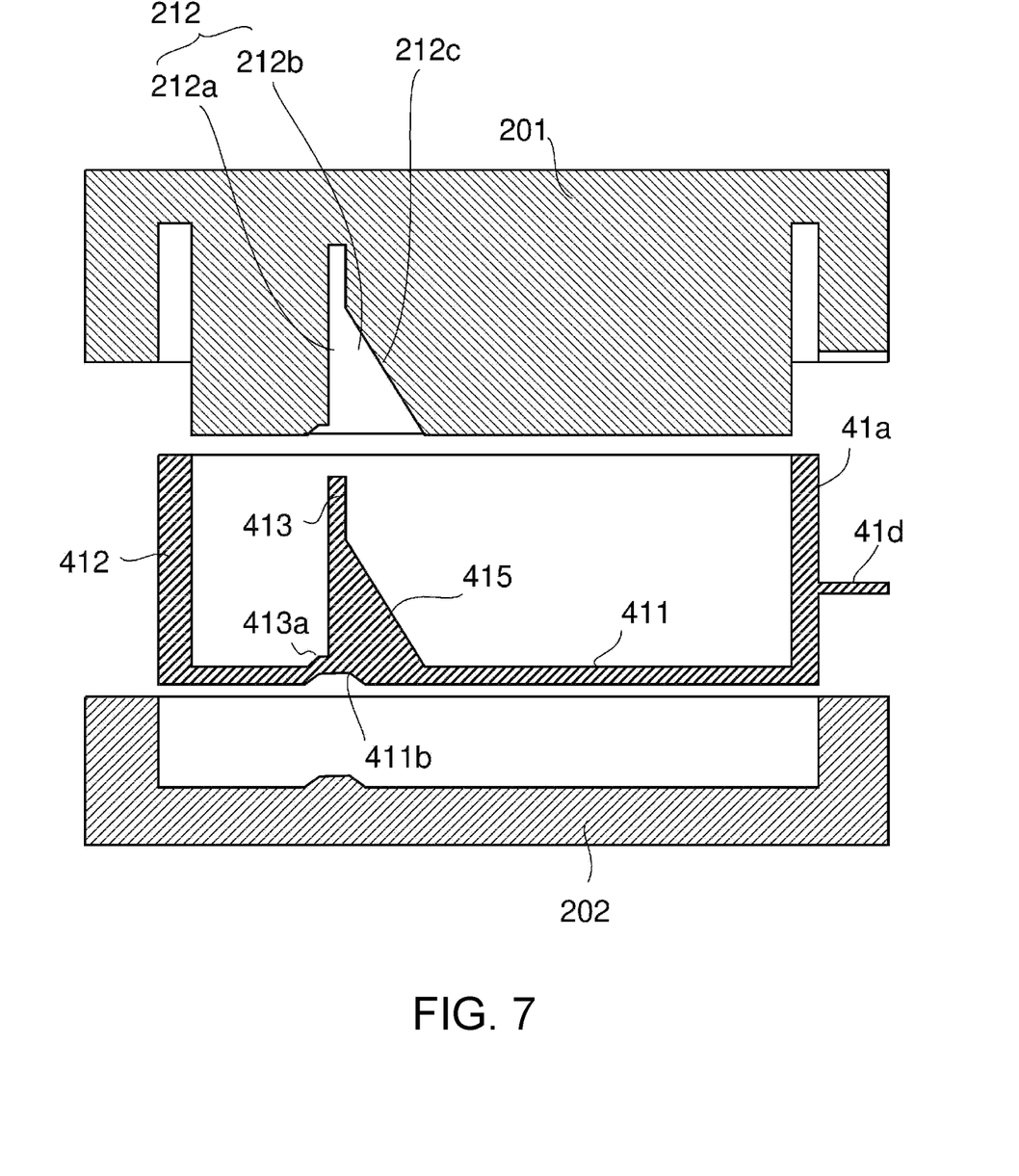
FIG. 7 is an explanatory diagram describing a manufacturing process of a base plate according to an exemplary embodiment of the present disclosure.

In step S4, the base body 41a is released from the pair of molds 201 and 202, as illustrated in FIG. 7. At this time, the peripheral wall 412 includes a gate mark 41d protruding from the outer surface. The gate mark 41d is defined by hardening the molten metal accumulated at the gate 214 and the air bleeding flow path (not illustrated).

Figure 8:
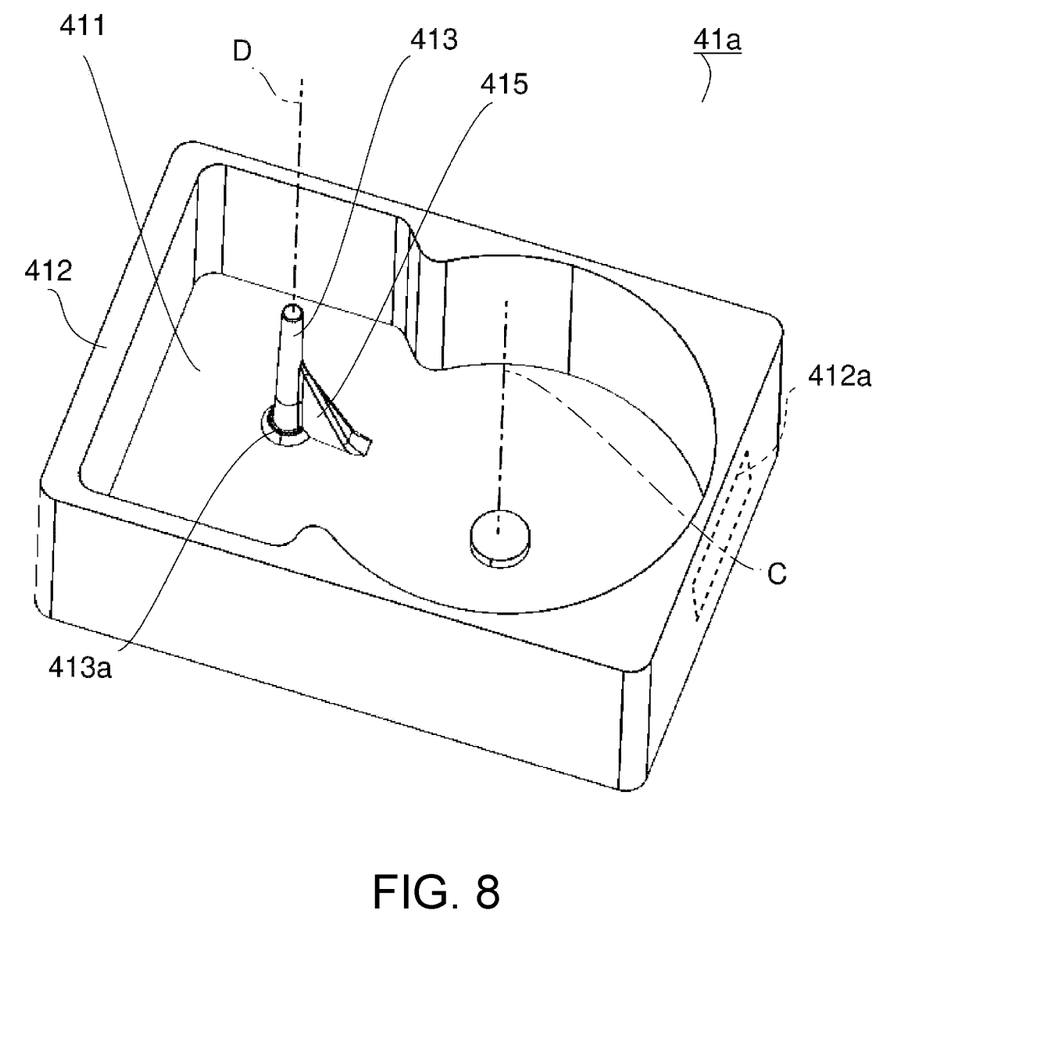
FIG. 8 is an explanatory diagram describing a manufacturing process of a base plate according to an exemplary embodiment of the present disclosure.

In step S5, the gate mark 41d is cut. FIG. 8 is a perspective view of the base body 41a, in which the base body 41a includes the bridge 415 defined by the guide 212b. The bridge 415 protrudes radially outward from the peripheral surface of the pivot post 413 and spans across the upper surface of the bottom plate 411. The gate mark 412a defined by cutting the gate mark 41d slightly protrudes from the outer surface of the peripheral wall 412 and a vestige is left.

Figure 9:
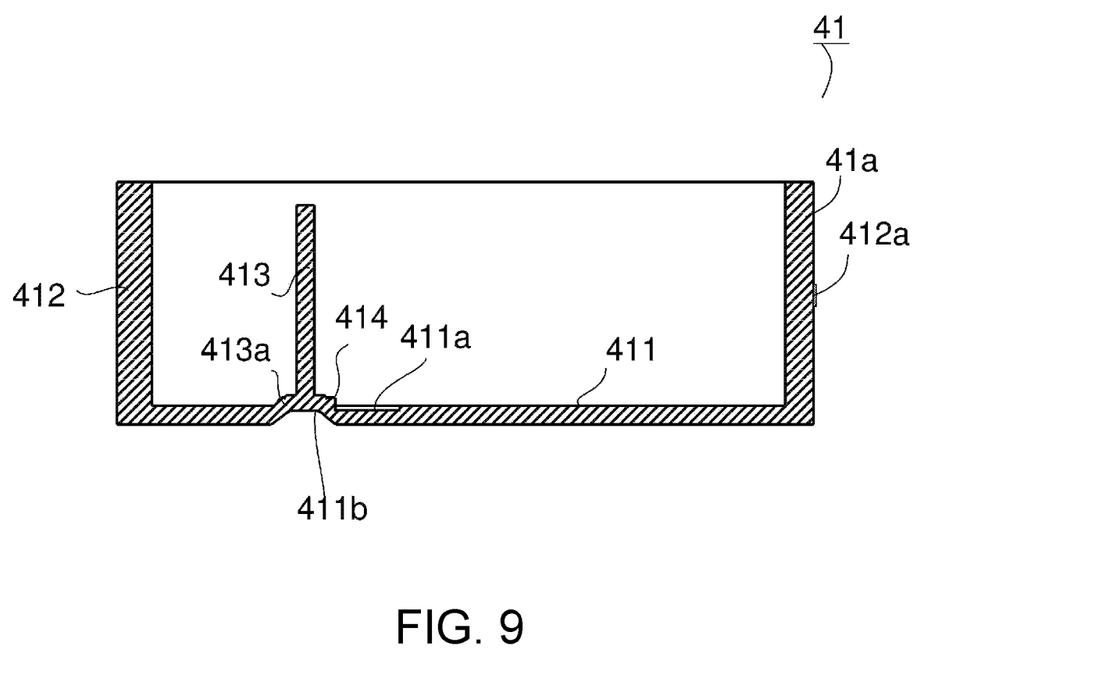
FIG. 9 is an explanatory diagram describing a manufacturing process of a base plate according to an exemplary embodiment of the present disclosure.

In step S6, the bridge 415 is cut as illustrated in FIG. 9. The bridge 415 is cut, and the protrusion 414 and the first concave part 411a are defined (see FIG. 2). The protrusion 414 is a vestige of the bridge 415.

The protrusion 414 is able to improve the rigidity of the root of the pivot post 413. By leaving the protrusion 414 and cutting the bridge 415, excessive cutting of the pivot post 413 is able to be prevented. By defining the first concave part 411a and cutting the bridge 415, a component is able to be disposed near the root of the pivot post 413. At this time, by defining the first concave part 411a to have a wider region than the protrusion 414, a component is able to be disposed relatively near the root of the pivot post 413.

When the bridge 415 is cut, the surface of the base body 41a undergoes cutting and machining and the first machined surface 71 is defined. The first machined surface 71 is defined by a portion of the peripheral surface of the pivot post 413 on which the bridge 415 was defined, an upper surface of the protrusion 414, and a bottom surface of the first concave part 411a. That is, the first machined surface 71 is disposed extending over the upper surface of the protrusion 414 from at least a portion of the peripheral surface of the pivot post 413. The first machined surface 71 further extends in the protrusion direction T from the upper surface of the protrusion 414 and a tip is defined on the upper surface of the bottom plate 411. At this time, the first concave part 411a is adjacent to the protrusion 414 at the first machined surface 71.

A length of the first machined surface 71 in the width direction orthogonal to the protrusion direction T is defined to increase away from the pivot post 413 (see FIG. 3). At this time, the first machined surface 71 is defined to decrease in size as approaching the pivot post 413. When the bridge 415 is cut, excessive cutting of the pivot post 413 is able to be further prevented. Accordingly, a machining time of cutting is able to be shortened, and a decrease in roundness accuracy of the pivot post 413 is able to be suppressed.

Figure 10:
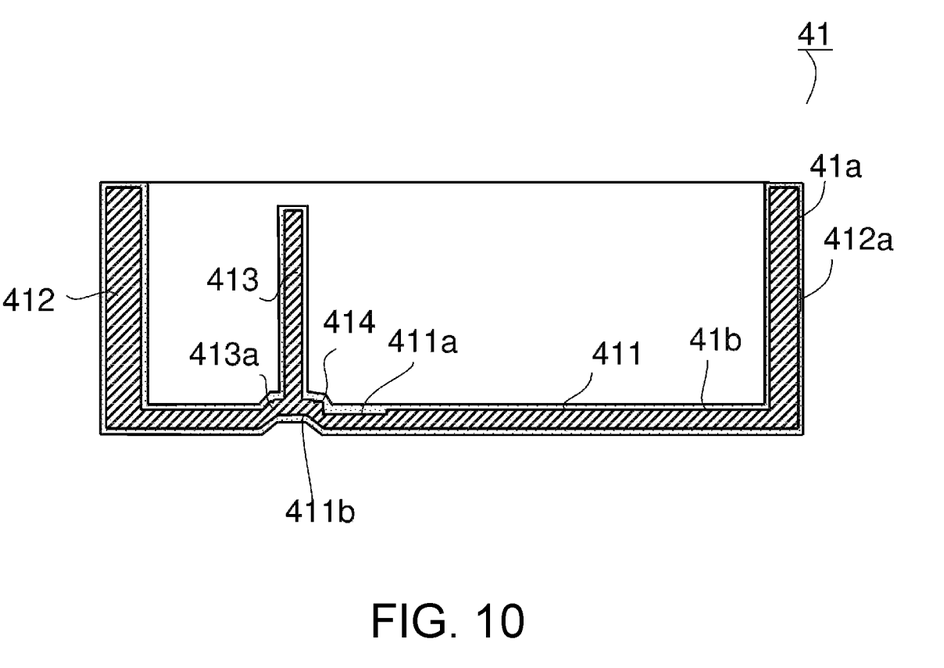
FIG. 10 is an explanatory diagram describing a manufacturing process of a base plate according to an exemplary embodiment of the present disclosure.

In step S7, as illustrated in FIG. 10, the electrodeposition coating film 41b is provided on the surface of the base body 41a. In the electrodeposition coating film 41b, the base body 41a is immersed in, for example, a coating material of an epoxy resin, and an electric current flows between the coating material and the base body 41a. Accordingly, the coating material adheres to the surface of the base body 41a, and the electrodeposition coating film 41b is provided on the surface of the base body 41a. At this time, an outer surface of the gate mark 412a is also covered with the electrodeposition coating film 41b.

Figure 11:
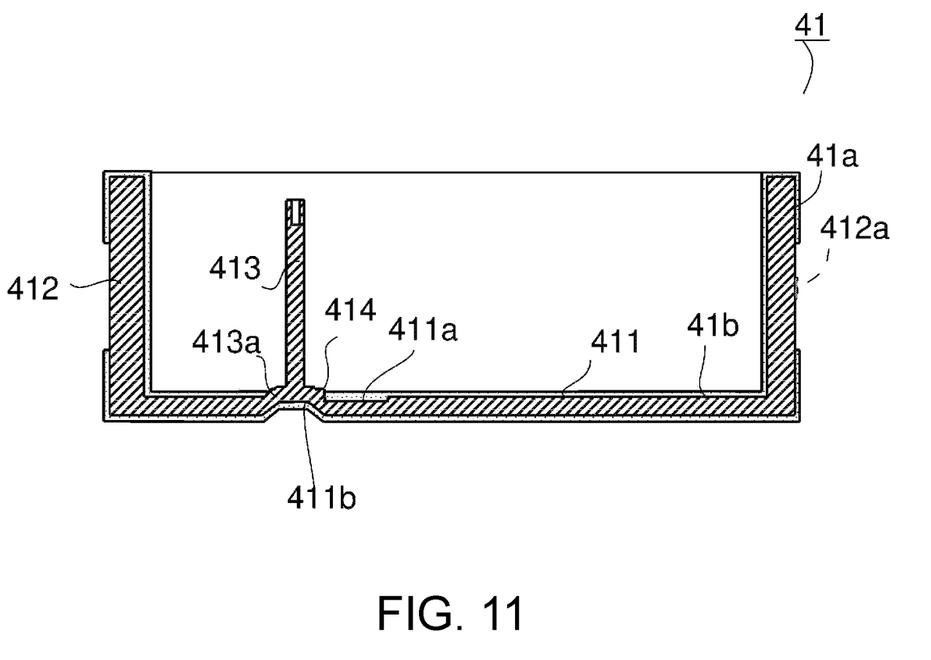
FIG. 11 is an explanatory diagram describing a manufacturing process of a base plate according to an exemplary embodiment of the present disclosure.

In step S8, as illustrated in FIG. 11, in the surface of the base body 41a, the pivot post 413 for which accuracy is required undergoes precision machining and shaping by cutting.

At this time, by cutting of the surface of the base body 41a, the electrodeposition coating film 41b is also cut. According, a region in which the electrodeposition coating film 41b is not provided is defined on the entire peripheral surface of the pivot post 413 and the upper surface of the protrusion 414.

In step S8, the entire outer surface of the peripheral wall 412 including the gate mark 412a defined when the gate mark 41d is removed in step S5 is cut and shaped. At this time, the electrodeposition coating film 41b on the outer peripheral surface of the peripheral wall 412 is cut, and a second machined surface 72 is defined. That is, in at least a portion of the peripheral wall 412, the second machined surface 72 defined by cutting and machining the surface of the base body 41a is defined so as to include at least a portion of the gate mark 412a. Accordingly, the gate mark 412a defined by the molten metal accumulated at the gate 214 and the air bleeding flow path (not illustrated) is able to be shaped by a series of operations. Therefore, workability in the cutting process is improved.

In the present embodiment, the second machined surface 72 is defined on the entire outer surface of the peripheral wall 412. However, the second machined surface 72 may be defined on only one surface of the peripheral wall 412 that includes the gate mark 412a. The second machined surface 72 may also be defined across one surface of the peripheral wall 412 that includes the gate mark 412a and at least one surface adjacent to the one surface.

In step S8, the gate mark 412a is removed by cutting and there is no vestige. However, in order to describe the vestige where a gate was connected during casting, the gate mark 412a is illustrated in broken lines in the drawings.

In step S9, the base body 41a is immersed in an impregnant. At this time, the impregnant infiltrates into at least a portion of the first machined surface 71 from which the electrodeposition coating film 41b has been cut and into the second machined surface 72. As the impregnant, for example, an epoxy resin or an acrylic resin is used. Accordingly, in at least a portion of the first machined surface 71 from which the electrodeposition coating film 41b has been cut and the second machined surface 72, a small cavity defined on the surface of the base body 41a is sealed with the impregnant. Accordingly, the helium gas filled inside the housing 40 is able to be prevented from leaking to the outside via the first machined surface 71 and the second machined surface 72.

The impregnant has less viscosity than the coating material defining the electrodeposition coating film 41. Hence, compared with the coating material defining the electrodeposition coating film 41, the impregnant is more likely to impregnate the small cavity defined on the surface of the base body 41a.

A manufacturing method of the base plate 41 of a casting product being a portion of the housing 40 of the disk drive apparatus 1 includes a casting process, a cutting process, an electrodeposition coating process, a shaping process and an impregnation process in order. In the casting process, the base body 41a that includes the bottom plate 411, the pivot post 413, and the bridge 415 is integrally cast by the molds 201 and 202 (steps S1 to S4). In the cutting process, the bridge 415 is cut (step S6). In the electrodeposition coating process, the electrodeposition coating film 41b is provided on the surface of the base body 41a (step S7). In the shaping process, the surface of the base body 41a is cut and shaped (step S8). In the impregnation process, a machined surface where the surface of the base body 41a is exposed from the electrodeposition coating film 41b is impregnated with the impregnant (step S9). By providing the bridge 415 and defining the pivot post 413, the occurrence of shrinkage cavities in the pivot post 413 is able to be reduced.

Figure 12:
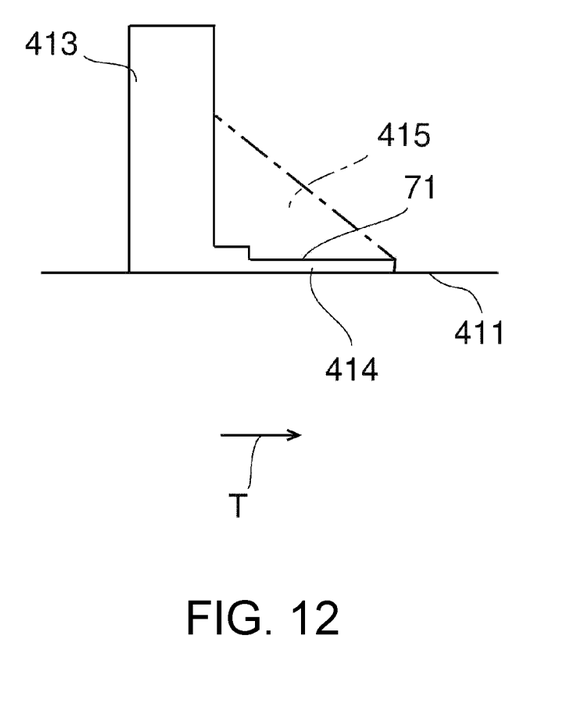
FIG. 12 is an explanatory diagram describing a first machined surface of a base plate according to an exemplary embodiment of the present disclosure.
Figure 13:
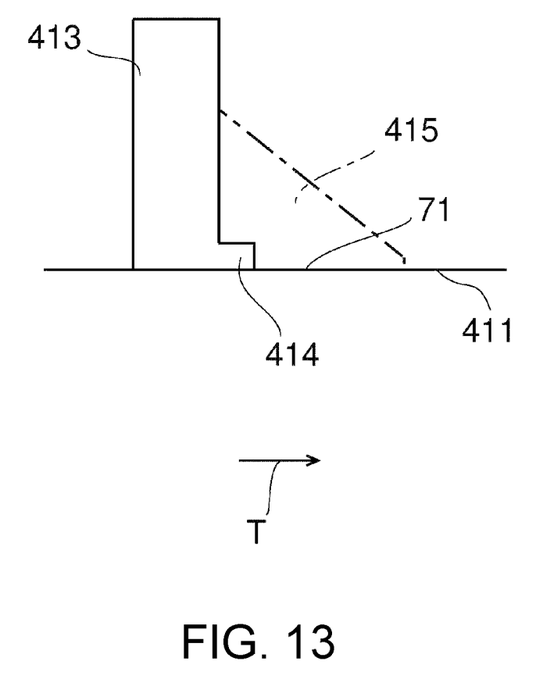
FIG. 13 is an explanatory diagram describing a first machined surface of a base plate according to an exemplary embodiment of the present disclosure.

For example, the first machined surface 71 may change shape depending on a cutting region of the bridge 415. FIG. 12 and FIG. 13 are explanatory diagrams describing the first machined surface 71. As illustrated in FIG. 12, the whole region where the bridge 415 spans across the bottom plate 411 may remain as the protrusion 414. At this time, the protrusion 414 is disposed up to a tip of the first machined surface 71 in the protrusion direction T. Accordingly, strength degradation of the bottom plate 411 due to cutting is able to be reduced.

As illustrated in FIG. 13, the bridge 415 may be cut flat without defining the first concave part 411a. At this time, the first machined surface 71 further extends forward in the protrusion direction T from the protrusion 414 and the tip is disposed on the upper surface of the bottom plate 411.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

According to the present disclosure, the present disclosure is able to be used in, for example, a housing used in a disk drive apparatus such as a hard disk drive.

What is claimed is:
1. A base plate being a portion of a housing of a disk drive apparatus, comprising:
 a base body being a casting product; and
 an electrodeposition coating film covering at least a portion of a surface of the base body, wherein the base body comprises:
  a bottom plate having a rectangular shape as viewed from an axial direction;
  a pivot post; and
  a protrusion, wherein
  the bottom plate extends perpendicular to a rotation axis of a disk and a swing axis of a head, the rotation axis extending vertically, the swing axis being disposed in a different position from the rotation axis and extending vertically, the head reading or writing information from or to the disk;
  the pivot post protrudes upward from an upper surface of the bottom plate along the swing axis;
  the protrusion is provided protruding radially outward from a peripheral surface of the pivot post and protruding to the upper surface of the bottom plate, wherein
  a first machined surface of the base body is disposed extending over an upper surface of the protrusion from at least a portion of the peripheral surface of the pivot post, wherein
  the first machined surface further extends in a protrusion direction from the upper surface of the protrusion and a tip is disposed on the upper surface of the bottom plate, wherein
  a length of the first machined surface in a width direction orthogonal to the protrusion direction is defined to increase away from the pivot post.

2. The base plate according to claim 1, wherein a length of the tip of the first machined surface in the protrusion direction in the width direction orthogonal to the protrusion direction is greater than a length of the protrusion in the width direction orthogonal to the protrusion direction.

3. The base plate according to claim 1, wherein the bottom plate comprises a first concave part adjacent to the protrusion at the first machined surface, the first concave part being defined by the upper surface of the bottom plate being recessed downward in the axial direction.

4. The base plate according to claim 1, wherein at least a portion of the first machined surface is infiltrated with an impregnant.

5. The base plate according to claim 4, wherein the impregnant is either an epoxy resin or an acrylic resin.

6. The base plate according to claim 1, wherein the pivot post comprises a pedestal having an annular shape and protruding radially outward from a peripheral surface of a root portion.

7. The base plate according to claim 1, wherein the bottom plate comprises a second concave part defined by a lower surface of the bottom plate opposed to the pivot post in the axial direction being recessed upward in the axial direction.

8. The base plate according to claim 1, wherein the base body comprises a peripheral wall extending upward from an outer peripheral edge of the bottom plate and surrounding the bottom plate;
  the peripheral wall comprises a gate mark where a gate was connected during casting;
  the gate mark is disposed on an outer surface of the peripheral wall intersecting a protrusion direction of the protrusion;
  in at least a portion of the peripheral wall, a second machined surface of the base body is defined so as to comprise at least a portion of the gate mark.

9. The base plate according to claim 8, wherein in the peripheral wall, the second machined surface is defined across one surface of the peripheral wall that comprises the gate mark and at least one surface adjacent to the one surface.

10. The base plate according to claim 8, wherein the second machined surface is defined on the entire outer surface of the peripheral wall.

11. The base plate according to claim 8, wherein at least a portion of the second machined surface is infiltrated with an impregnant.

12. The base plate according to claim 11, wherein the impregnant is either an epoxy resin or an acrylic resin.

13. A spindle motor, comprising the base plate according to claim 1.

14. A disk drive apparatus, comprising:
  the spindle motor according to claim 13;
  a disk rotated about the rotation axis by the spindle motor; and
  a head swinging about the swing axis and reading or writing information from or to the disk.

15. The disk drive apparatus according to claim 14, wherein
  a gas having a density lower than that of air is filled inside the housing.

* * * * *